United States Patent Office 3,502,642
Patented Mar. 24, 1970

3,502,642
REACTIVE COPPER-CONTAINING BENZENE-AZONAPHTHALENE DYES CONTAINING A TRICHLOROPYRIMIDINE GROUP
Paul Dussy, Munchenstein, Switzerland, assignor to J. R. Geigy A.G., Basel, Switzerland
No Drawing. Continuation of application Ser. No. 425,942, Jan. 15, 1965, now Patent No. 73,200, dated Dec. 2, 1960. This application July 24, 1967, Ser. No. 655,668
Int. Cl. C09b 62/24; D06p 3/60, 3/04
U.S. Cl. 260—146                 6 Claims

ABSTRACT OF THE DISCLOSURE

Dyestuffs of the general formula

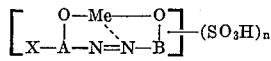

give good fastness to wet and light on cellulose and polyamide fibers.

In the above formula:
X represents a dizinylamino group the organic radical of which contains at least one mobile substituent which reacts with alkalies while splitting off as anion,
A represents a possibly further substituted, at most dinuclear radical of the benzene series which contains the oxygen atom in a position ortho to the azo linkage,
B represents a possibly further substituted radical of the naphthalene series which contains the oxygen atom in o-position to the azo linkage,
Me represents a heavy metal of the atomic numbers 24 to 29 which can also contain other co-ordinated complex formers, and
$n$ represents a positive whole number from 1 to at most 5.

---

This application is a continuation of application Ser. No. 425,942, filed Jan. 15, 1965, and now abandoned; the latter application being a continuation of application Ser. No. 73,200, filed Dec. 2, 1960, and now abandoned.

The present invention concerns metal-containing reactive azo dyestuffs, process for the production thereof, their use for the fast dyeing and printing of textile material as well as the material fast dyed or printed therewith.

It has been found that dyeings which have very good fastness to wet and light are obtained on cellulose and polyamide fibres with dyestuffs of the general Formula I

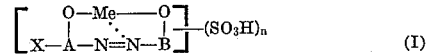 (I)

which can be fixed onto these fibres.

In the above formula:

X represents a diazinylamino group the organic radical of which contains at least one mobile substituent which reacts with alkalies while splitting off as anion,
A represents a possibly further substituent, at most dinuclear radical of the benzene series which contains the oxygent atom in a position ortho to the azo linkage,
B represents a possibly further substituted radical of the naphthalene series which contains the oxygen atom in o-position to the azo linkage,
Me represents a heavy metal of the atomic numbers 24 to 29 which can also contain other co-ordinated complex formers, and
$n$ represents a positive whole number from 1 to at most 5.

The dyestuffs according to the invention are obtained by two different processes.

The first consists in treating a heavy metal-containing azo dyestuff of the general Formula I in which X is an acylatable primary or secondary amino group, with a six-membered heterocyclic compound of aromatic character which contains two tertiary ring nitrogen atoms and at least two mobile substituents at ring carbon atoms vicinal to such N atoms. Primarily halogen atoms, in particular those of the atomic numbers 17 to 35, i.e. chlorine and bromine are used as such mobile substituents. Preferred compounds are of the meta-diazine series. Such cyclic carbimide halides usable in the process according to the invention as azinylating agents are, e.g. the 2,4- and 2,6-dichloro- or 2,4- and 2,6-dibromo-pyrimidines which can contain in the remaining positions other substituents, in particular further halogen atoms or negative groups such as nitro, cyano, acyl or also only alkyl or phenyl groups. Particularly valuable dyestuffs according to the invention are obtained on using 2,4,6-trichloropyrimidine and derivatives thereof, in particular 2,4,5,6-tetrachloropyrimidine.

The azinylating agent is used in at least equimolecular amount and possibly in the form of a suspension or solution in an inert organic solvent such as, e.g. in a low aliphatic ketone. It is allowed to act upon the amino azo dyestuff until the amino group to be acylated can no longer be traced. This is done, for example, by diazotising and coupling if primary amino groups are to be acylated, which is preferably the case. In addition, the reaction with the acylating agent is performed under such conditions that, on completion of the azinylation, the diazine ring contains at least one mobile substituent, that is in the case of the above mentioned, preferred cyclic carbimide halides, the diazine ring still contains at least one mobile halogen atom. Thus, too high temperatures and too high pH value of the reaction medium are to be avoided as much as possible. The reaction is performed advantageously with the aqueous solution of an alkali metal salt of the metal-containing amino azo dyestuff at a temperature between about 0 and 60° and a pH of the reaction medium between about 3 and 8. The optimal reaction conditions depend on the reactivity of the azinylating agent to be used and the basicity of the amino group of the amino azo dyestuff and they usually differ from case to case. The dyestuff according to the invention is isolated from its aqueous solution, most simply by salting out the alkali metal salt in weakly acid or, better still, in neutral solution. Drying is performed advantageously at a moderately raised temperature in vacuo.

The second process for the production of dyestuffs according to the invention consists in treating a metallisable azo dyestuff of the general Formula II

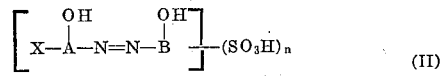 (II)

in which the symbols X, A, B and $n$ have the meanings given in Formula I, with a heavy metal, particularly a heavy metal of the atomic numbers 24–29. Valuable dyestuffs are obtained principally with chromium, cobalt and nickel and particularly valuable dyestuffs are obtained with agents giving off copper. These metals are used in the usual form, for example as mineral acid or fatty acid salts. If desired, also complex salts, in particular of the co-ordinative hexavalent metals chromium and cobalt can be used as agent introducing metal, which complexes contain already complexly bound, uncoloured or coloured compounds such as, e.g. organic α- or β-hydroxycarboxylic acids or an o,o'-dihydroxy-, o-hydroxy-o'-amino- or o-hydroxy-o'-carboxyazo dyestuff, whereby a co-ordinated o,o'-dihydroxy azo dyestuff can be identical with or different from the dyestuff of Formula II. The conditions for metallising the diazinylamino azo dyestuff are so chosen that the mobile substituents bound at the azine ring are retained. Thus the pH of the reaction medium and reaction temperature should be as low as possible. The metallising is performed, for example, in the presence of ammonia or of a tertiary amine as mineral acid buffering agent. It is performed advantageously, however, in the presence of an alkali metal salt of a low fatty acid at a moderately elevated temperature such as between about 30 and 80° C.

The amino-o,o'-dihydroxy azo compounds necessary in the two above processes as starting materials which correspond to the general Formula II in which X is an azinylatable primary or secondary amino group and the other symbols have the same meanings as given in Formula II, as well as their complex heavy metal compounds, are obtained from known dyestuff intermediate products by methods known per se. For example, a nitro-o-hydroxy- or an acylamino-o-hydroxy- diazo compound of the benzene series, particularly an acetylamino-o-hydroxy diazo compound of the benzene series, is coupled with a possibly substituted hydroxynaphthalene, the coupling possibly being performed with the use of agents which accelerate the reaction such as tertiary nitrogen bases, and the nitro group is reduced or the acylamino group is saponified to the amino group. The diazo and azo components used can also contain other substituents usual in azo dyestuffs such as, e.g. halogen, cyano, alkyl, alkoxy, sulphonic acid, sulphonic acid amide or ester groups and carboxylic acid and carboxylic acid amide groups and, possibly, also nitro groups. These acyclic radicals are preferred substituents of the amino-o,o'-dihydroxy azo compounds used as starting materials; the starting materials however, can also contain cyclic radicals such as, e.g. phenyl, phenoxy, phenylazo, phenylsulphonyl and phenylsulphonic acid amido and phenylcarboxylic acid amido groups, in which the phenyl groups can be further substituted. Finally, the critical substituent X, i.e. the azinylatable amino group, can also be in such an "external" aryl radical.

The dyestuffs for the production process according to the example first mentioned above must contain heavy metal, i.e. before being used for the azinylation, they must be converted with agents giving off heavy metal into their complex heavy metal compounds. This is done by treating them with agents giving off chromium, cobalt, nickel or copper by the usual methods known per se; it is also possible to use o-alkoxy-o-hydroxy azo dyestuffs.

For the use as starting materials for the second process according to the invention mentioned above, i.e. the metallisation of dyestuffs of the general Formula II containing diazinylamino groups, the amino-o,o'-dihydroxy azo compounds must first be azinylated. This is done by condensing them with the diazine compounds of multiple reactivity described above.

When using the dyestuffs according to the invention for the pad dyeing and printing of cellulose fibres, it is important that they be well soluble in the form of their alkali metal salts even in salt-containing and weakly acid aqueous liquor. This good water solubility is ensured by the choice of starting components, that is by ensuring that there are at least two but advantageously not more than four sulphonic acid groups present. These are preferably distributed in the two radicals of the diazo and azo components, but some of them may also be in the diazinylamino radical.

Preferred dyestuffs according to the invention contain the diazinylamino group in o- or p-position to the oxygen atom present in the radical A. They also contain a sulphonic acid group in the p- or o-position to the oxygen atom. A second class of preferred dyestuffs according to the invention contain the diazinyl amino group in the p-position to the azo linkage. In this case there is possibly also a substituent present in the p-position to the oxygen atom which is, advantageously, halogen, an alkyl, alkylsulphonyl or sulphonic acid group.

Particularly valuable dyestuffs correspond to the formula

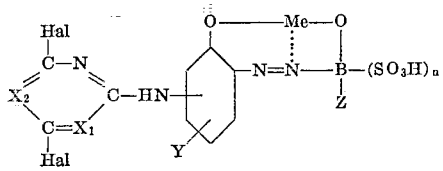

wherein

B represents the naphthalene radical containing the oxygen atom in the o-position to the azo linkage, of $X_1$ and $X_2$, the one is =N— and the other is a member selected from the group consisting of

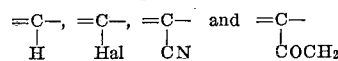

Hal represents a member selected from the group consisting of Cl and Br,

Y represents a member selected from the group consisting of hydrogen, sulphonic acid, methyl, chlorine, lower alkylsulphonyl and lower alkoxy radicals, Z represents a member selected from the group consisting of hydrogen, hydroxy, amino, phenylamino and acylamino radicals, Me represents a heavy metal with the atomic numbers 24 to 29, and $n$ is a positive whole number of at most 3.

In these dyestuffs, the radical Me is principally copper but it can also be

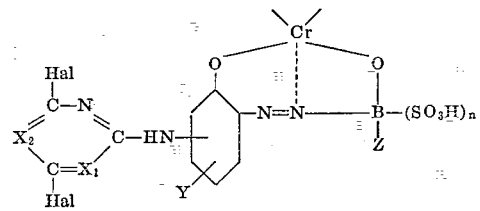

and

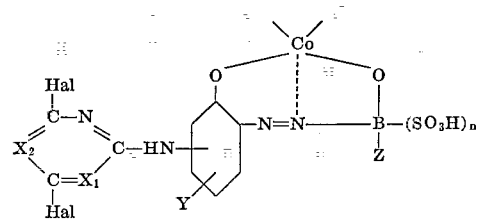

As has already been mentioned, the copper compounds are a particularly valuable class of dyestuffs according to the invention as they produce dyeings, particularly on cellulose of a valuable blue shade. In this case, Y is advantageously H or —SO$_3$H.

In addition, dyestuffs which contain the trichloropyrimidylamino group are preferred. It is difficult to determine from the dyestuff molecule which halogen atom of the halogen pyrimidine is exchanged for the dyestuff amino radical. Very probably the latter radical is bound to the pyrimidine ring in the 2- or 4-position.

Also, the preferred naphthalene radical is the radical of a 1-hydroxynaphthalene compound which preferably is further substituted in the 8-position. Thus, the most valuable class of dyestuffs according to the invention have the formula

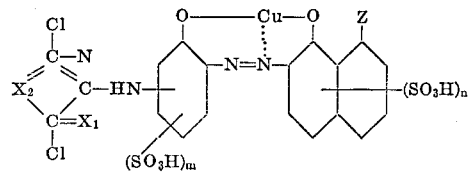

wherein of $X_1$ and $X_2$, the one is =N— and the other is $$=\underset{\underset{Cl}{|}}{C}-$$

Z represents a member selected from the group consisting of hydrogen, hydroxy, sulphonic acid, amino, phenylamino and acylamino radicals, $n$ is a whole positive number of at most 2 and $m$ represents one of the numerals 0 and 1.

The dyestuff preferably contains 2 to 3 sulphonic acid groups.

The azo dyestuffs obtained according to the invention are red to black powders which, in the form of their alkali metal salts, are particularly well soluble in water. They are suitable for the dyeing and printing of fibres, in particular those from natural or regenerated cellulose and polyamide fibres, in red, red-brown, violet, blue, green to dark grey shades. The cellulose material is impregnated or printed advantageously at a low temperature, e.g., at 20–50° C., with the possibly thickened dyestuff solution and then the dyestuff is fixed by treating with acid binding agents. Examples of such are sodium carbonate, potassium carbonate, di- and tri-sodium phosphate, caustic soda lye, caustic potash solution and, at temperatures of over 50° C., also potassium or sodium bicarbonate. Although the treatment with these agents can be performed at even room temperature or at a slightly raised temperature, often better results are obtained (advantageously after a mild intermediate drying of the impregnated or printed goods) at a raised temperature, e.g., at 70–160° C. Instead of an alkaline after-treatment, in particular when the dye is fixed hot, the acid binding agent can also be added to the impregnating liquors or to the printing pastes and then the dyeing is developed by a short heating to temperatures of over 100–160° C. or by heating for a longer period at room temperature. The addition of hydrotropic agents to the printing inks and impregnating liquors is advantageous in this process, for example, the addition of urea in amounts of 10 to 200 g. per litre dyeing agent.

The new dyestuffs are chemically bound to the fibre by the treatment with acid binding agents and, after soaping to remove non-fixed dyestuff, the cellulose dyeings produced with the new dyestuffs have excellent wet fastness and very good fastness to light. A further technical advance of these new dyestuffs to be evaluated is the fact that, on soaping, generally only a slight part of the dyestuff is removed and, therefore, there is not a great difference in the colour strength of the dyeings before and after this process. In addition, the new dyestuffs are distinguished by a slight substantivity which enables non-fixed dyestuff to be very easily washed out of the goods. Finally attention is drawn to a further valuable property of the dyestuffs according to the invention, namely their relatively good stability in alkaline media for which reason they are particularly suitable for use in printing pastes not for immediate use.

Further details will be seen from the following examples. The temperatures are given therein in degrees centigrade. Where not otherwise expressly stated, parts are given as parts by weight. The relationship of parts by weight to parts by volume is as that of grammes to cubic centimetres.

EXAMPLE 1

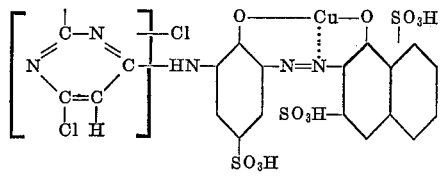

The diazonium salt solution, produced by diazotising 26.2 parts of 2-amino-6-carbomethoxyamino-1-hydroxybenzene-4-sulphonic acid with 6.9 parts of sodium nitrite in the presence of hydrochloric acid, is mixed with the solution of 30 parts of sodium carbonate and 30.3 parts of 1-hydroxynaphthalene-3,8-disulphonic acid in 200 parts of water. As soon as the coupling is complete, the dyestuff is precipitated with sodium chloride, filtered off, washed with dilute sodium chloride solution and again dissolved in 500 parts of 5% caustic soda lye. The solution is stirred for an hour at 90–95° until the carbomethoxyamino groups are saponified. Then at 60–65°, the pH of the solution is adjusted to 4.5–5.0 with acetic acid and then the solution of 25 parts of crystallised copper sulphate in 100 parts of water is added. The whole is stirred for an hour at 60–65°, the coppered amino monoazo dyestuff is precipitated with sodium chloride, filtered off and washed with sodium chloride solution. The moist dyestuff is dissolved in 500 parts of water and 18.5 parts of 2,4,6-trichloropyrimidine are added at 40–45° within one hour, the pH of the reaction mixture being kept at 6.5–7.0 by the simultaneous addition dropwise of sodium carbonate solution. As soon as no more free amino groups can be traced, the condensation product, which consists of a mixture of 2,6-dichloropyrimidinyl-(4)-amino- and 4,6-dichloropyrimidinyl-(2)-aminoazo dyestuff, is precipitated with sodium chloride, filtered off, washed with sodium chloride solution and dried in vacuo at 60–70°. The copper-containing dyestuff is a dark powder which dissolves in water with a ruby-red colour.

If cotton is treated in the foulard at 50° with a 1% aqueous solution of this dyestuff which solution also contains 20 g. of sodium carbonate and 200 g. of urea per litre, the impregnated goods are dried, then heated for 4 minutes at 140–160° and finally soaped at the boil for 30 minutes, then a deep ruby-red dyeing is obtained which has very good fastness to light and good wet fastness properties.

Similar dyestuffs are obtained if, in the above example, the 26.2 parts of 2-amino-6-carbomethoxyamino-1-hydroxybenzene-4- sulphonic acid are replaced by the equivalent amount of 2-amino-6-acetylamino- or 2-amino-6-propionylamino- 1-hydroxybenzene-4-sulphonic acid or of 2-amino-6-acetylamino-4-methyl-1-hydroxybenzene or, if instead of the 18.5 parts of 2,4,6-trichloropyrimidine, the equivalent amount of 5-bromo-2,4,6-trichloropyrimidine, 2,4,5,6-tetrachloropyrimidine, 2,4,5,6-tetrabromopyrimidine, 5 - acetyl-2,4,6 - trichloropyrimidine, 5-nitrilo-2,4,6-tetrachloropyrimidine or 2,4,6-tribromopyrimidine are used.

Copper-containing dyestuffs having similar properties are also obtained if in the above example, the 30.3 parts of 1-hydroxynaphthalene-3,8-disulphonic acid are replaced by an equivalent amount of one of the coupling components given in the following Table.

| Dyestuff No. | Coupling component | Shade on cellulose fibres |
|---|---|---|
| 1 | 1-hydroxynaphthalene-4,8-disulphonic acid. | Ruby-red. |
| 2 | 1-hydroxynaphthalene-3,6-disulphonic acid. | Do. |
| 3 | 1-hydroxynaphthalene-4,6-disulphonic acid. | Do. |
| 5 | 1-hydroxynaphthalene-4,7-disulphonic acid. | Do. |
| 5 | 2-hydroxynaphthalene-3,6-disulphonic acid. | Do. |
| 6 | 2-hydroxynaphthalene-4,7-disulphonic acid. | Do. |
| 7 | 2-hydroxynaphthalene-4,8-disulphonic acid. | Do. |
| 8 | 2-hydroxynaphthalene-5,7-disulphonic acid. | Do. |
| 9 | 1-amino-8-hydroxynaphthalene-2,4-disulphonic acid. | Blueish violet. |
| 10 | 1-amino-8-hydroxynaphthalene-2-sulphonic acid. | Do. |
| 11 | 2-amino-8-hydroxynaphthalene-3,6-disulphonic acid. | Reddish grey. |
| 12 | 1,8-dihydroxynaphthalene-3,6-disulphonic acid. | Violet. |
| 13 | 1-phenylamino-8-hydroxynaphthalene-4,6-disulphonic acid. | Reddish navy blue. |
| 14 | 2-amino-5-hydroxynaphthalene-1,7-disulphonic acid. | Ruby-red. |

EXAMPLE 2

The dyestuff mentioned in the first paragraph of example 1 can also be produced by the following process:

The diazonium salt solution, produced by diazotising 24.6 parts of 2-amino-6-acetylamino-1-hydroxybenzene-4-sulphonic acid with 6.9 parts of sodium nitrite in the presence of hydrochloric acid, is mixed with the solution of 30 parts of sodium carbonate and 30.3 parts of 1-hydroxynaphthalene-3,8-disulphonic acid in 200 parts of water. As soon as the coupling is complete, the dyestuff is precipitated with sodium chloride, filtered off, washed with dilute sodium chloride solution and dissolved in 500 parts of 5% caustic soda lye. The solution is stirred for 1 hour at 90–95° until the acetylamino groups are saponified. The pH of the solution is adjusted at 40–45° with acetic acid to 6.5–7.0 and then 18.5 parts of 2,4,6-trichloropyrimidine are sprinkled in within 1 hour. The pH of the reaction mixture is kept at 6.5–7.0 by the simultaneous addition dropwise of sodium carbonate solution. As soon as no more free amino groups can be traced, the condensation product is precipitated with sodium chloride, filtered off and washed with sodium chloride solution. The moist dyestuff is dissolved in 500 parts of 60° warm water, 30 parts of sodium acetate are added and then the solution of 25 parts of crystallised copper sulphate in 100 parts of water is added dropwise. The whole is stirred for 1 hour at 60–65°, the coppered monoazo dyestuff is precipitated with sodium chloride, filtered off and washed with sodium chloride solution and dried in vacuo at 60–80°.

EXAMPLE 3

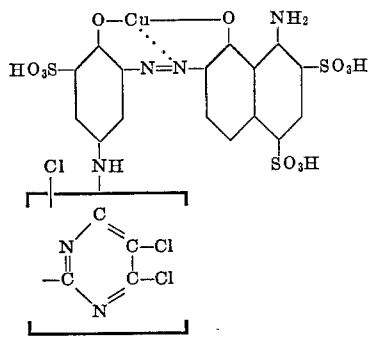

24.6 parts of 2 - amino - 4 - acetylamino-1-hydroxybenzene-6-sulphonic acid in 200 parts of water are diazotised in the usual way with 6.9 parts of sodium nitrite and 25 parts of 30% hydrochloric acid. The diazonium compound is mixed at 0–5° with a solution of 31.7 parts of 1-amino-8-hydroxynaphthalene-2,4-disulphonic acid and 30 parts of sodium carbonate in 200 parts of water. As soon as the couplling is complete, the monoazo dyestuff is precipitated with 20% of the volume of sodium chloride, filtered off and washed with a 20% sodium chloride solution. The dyestuff is stirred for 1½ hours at 90–95° with 500 parts of 5% caustic soda lye to saponify the acetylamino group. The pH of the solution is then adjusted at 60–65° to 4.5–5.0 by the addition of acetic acid. The solution of 25 parts of crystallised copper sulphate in 100 parts of water is added and the mixture is stirred for 1 hour at 60–65°. The coppered monoazo dyestuff is then precipitated with sodium chloride, filtered off, washed with sodium chloride solution and again dissolved in 500 parts of water at 40–45°. 21.8 parts of 2,4,5,6-tetrachloropyrimidine are then added with 1 hour and the pH value of the reaction mixture is kept at 6.5–7.0 by the simultaneous addition dropwise of a sodium carbonate solution. As soon as no more free amino groups can be traced, the new reactive dyestuff which consists of a mixture of 2,5,6-trichloropyrimidinyl-(4)-amino- and 4,5,6-trichloropyrimidinyl-(2)-amino- azo dyestuff, is precipitated with sodium chloride, filtered off, washed with dilute sodium chloride solution and dried in vacuo at 60–70°. It is a dark blue powder which dissolves in water with a blue colour.

If cotton is treated in the foulard at 50° with a 2% solution of this dyestuff, which solution also contains 5% of urea and 1% of sodium carbonate, then dried at 80°, then steamed for 10 minutes at 100–110° and soaped at the boil, then a deep, pure blue dyeing which has good fastness to light and washing is obtained.

Similar dyestuffs are obtained if, in the above example, instead of the 24.6 parts of 2-amino-4-acetylamino-1-hydroxybenzene-6-sulphonic acid, the equivalent amount of 2 - amino - 4 - carbomethoxyamino-1-hydroxybenzene-6-sulphonic acid or of 2-amino-4-propionylamino-1-hydroxybenzene-6-sulphonic acid is used or if, instead of the 21.8 parts of 2,4,5,6-tetrachloropyrimidine, the equivalent amount of 5-bromo-2,4,6-trichloropyrimidine, 2,4,6-trichloropyrimidine, 2,4,5,6-tetrabromopyrimidine, 5-acetyl-2,4,6-trichloropyrimidine, 5 - nitrilo - 2,4,6 - trichloropyrimidine or 2,4,6-tribromopyrimidine is used.

Similar dyestuffs are also obtained if, in the above example instead of the 31.7 parts of 1-amino-8-hydroxynaphthalene-2,4-disulphonic acid, the equivalent amount of one of the coupling components given in the following table is used.

| Dyestuff No. | Coupling component | Shade on cellulose fibres |
|---|---|---|
| 1 | 1-hydroxynaphthalene-3,8-disulphonic acid. | Blueish violet. |
| 2 | 1-hydroxynaphthalene-5,8-disulphonic acid. | Do. |
| 3 | 1-hydroxynaphthalene-4,6-disulphonic acid. | Do. |
| 4 | 1-hydroxynaphthalene-4,7-disulphonic acid. | Do. |
| 5 | 1-hydroxynaphthalene-5,7-disulphonic acid. | Do. |
| 6 | 2-hydroxynaphthalene-5,7-disulphonic acid. | Do. |
| 7 | 2-hydroxynaphthalene-3,6-disulphonic acid. | Do. |
| 8 | 2-hydroxynaphthalene-4,6-disulphonic acid. | Violet. |
| 9 | 2-hydroxynaphthalene-4,7-disulphonic acid. | Do. |
| 10 | 2-hydroxynaphthalene-4,8-disulphonic acid. | Do. |
| 11 | 1-hydroxynaphthalene-4,8-disulphonic acid. | Blue-violet. |
| 12 | 1-amino-8-hydroxynaphthalene-2-sulphonic acid. | Blue. |
| 13 | 2-amino-8-hydroxynaphthalene-3,6-disulphonic acid. | Grey. |
| 14 | 1,8-dihydroxynaphthalene-3,6-disulphonic acid. | Blue |
| 15 | 1-phenylamino-8-hydroxynaphthalene-4,6-disulphonic acid. | Navy blue. |
| 16 | 1-hydroxynaphthalene-3,6,8-trisulphonic acid. | Blue. |
| 17 | 2-amino-5-hydroxynaphthalene-1,7-disulphonic acid. | Violet. |

EXAMPLE 4

The dyestuff mentioned in the first paragraph of Example 3 can be produced by the following process also:

38.6 parts of a mixture, about ⅔ of which consist of 4 - [2′,5′,6′ - trichloropyrimidinyl - (4′) - amino] - 2-amino-1-hydroxybenzene-6-sulphonic acid and about ⅓ of which consists of [4′,5′,6′-trichloropyrimidinyl-(2′)-amino]-2-amino-1-hydroxybenzene-6-sulphonic acid, are diazotised with 6.9 parts of sodium nitrite in the presence of hydrochloric acid. The above mixture is produced by condensing 2-acetylamino-4 - amino - 1 - hydroxybenzene-6-sulphonic acid with 2,4,5,6-tetrachloropyrimidine and then saponifying the acetylamino groups with 10% aqueous hydrochloric acid at 90°. The diazonium compound is mixed at 0–5° with a solution of 31.7 parts of 1-amino-8-hydroxynaphthalene-2,4-disulphonic acid and 30 parts of sodium carbonate in 200 parts of water. As soon as the coupling is complete, the monoazo dyestuff is precipitated with 20% of the volume of sodium chloride, filtered off and washed with a 20% sodium chloride solution. The dyestuff is then dissolved in 500 parts of 60–65° warm water.

30 parts of sodium acetate and a solution of 25 parts of crystallised copper sulphate in 100 parts of water are then added and the mixture is stirred for 1 hour at 60–65°. The coppered monoazo dyestuff is then precipitated with sodium chloride, filtered off, washed with sodium chloride solution and dried in vacuo at 80°.

EXAMPLE 5

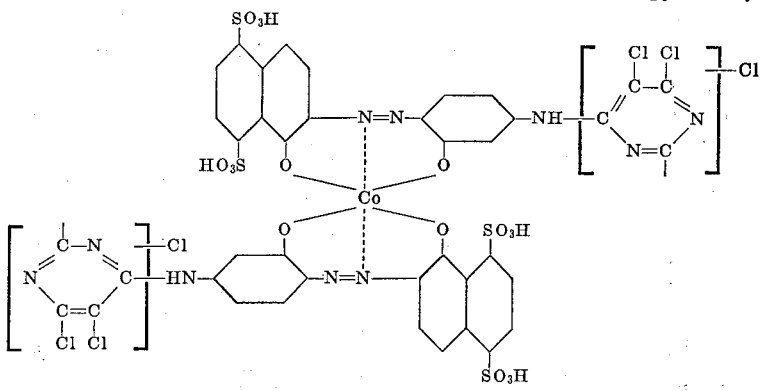

The diazo compound from 15.4 parts of 5-nitro-2-amino-1-hydroxybenzene produced in the usual manner is coupled at 5° in the presence of 30 parts of sodium carbonate with 30.3 parts of 1-hydroxynaphthalene-5,8-disulphonic acid in 300 parts of water. On completion of the coupling, the solution is heated to 40–45° and 43 parts of crystallised sodium sulphide are added. The whole is stirred for 60 minutes at 40–45° and then the amino monoazo dyestuff formed is precipitated with hydrochloric acid, filtered off and washed with mineral acid sodium chloride solution. The dyestuff is again dissolved in 500 parts of water at 40–45° with the addition of sodium acetate, animal charcoal is added to the solution and it is clarified. The solution is then heated to 85°, 12.4 parts of crystallised cobalt acetate are added and the whole is stirred for 2 hours at 80–85°, whereupon the pH of the solution is adjusted to 6.0–6.5 with sodium carbonate. 21.8 parts of 2,4,5,6-tetrachloropyrimidine are then sprinkled in within 3 hours at 40–45° and the pH of the mixture is kept at 6.0–6.5 by the simultaneous addition of sodium carbonate solution. As soon as no more free amino groups can be traced, the new dyestuff, which consists of a mixture of the cobalt-containing isomeric 2,5,6-trichloropyrimidinyl-(4)-amino- and 4,5,6-trichloropyrimidinyl-(2)-amino- azo dyestuffs, is precipitated by the addition of 20% by volume of sodium chloride, filtered off and dried at 60–65° in vacuo. The dyestuff is a violet-black powder which dissolves in water with a violet colour.

If cotton is treated in the foulard at 50° with a 2% solution of this dyestuff, which solution contains 20 g. of sodium carbonate and 200 g. of urea per litre, the impregnated goods are steamed for 10 minutes at 100–110° and then soaped at the boil for 30 minutes, then a level, violet dyeing which is fast to washing is obtained.

Similar dyestuffs are obtained, if in the above example, the 21.8 parts of 2,4,5,6-tetrachloropyrimidine are replaced by the equivalent amount of 5-bromo-2,4,6-trichloropyrimidine, 2,4,6-trichloropyrimidine or 2,4,6-tribromopyrimidine or if, instead of the metallised amino monoazo dyestuff described, the equivalent amount of a metal-containing amino monoazo dyestuff is used which is produced from one of the dyestuffs given in the following table in an analogous way.

| Dyestuff No. | Diazo component | Coupling component | Complexly bound metal | Shade on cellulose fibres |
|---|---|---|---|---|
| 1 | 5-nitro-2-amino-1-hydroxybenzene. | 1-hydroxynaphthalene-4,8-disulphonic acid. | Cr | Blue. |
| 2 | do | 2-hydroxynaphthalene-3,6-disulphonic acid. | Co | Violet. |
| 3 | do | 1-amino-8-hydroxynaphthalene-2,4-disulphonic acid. | Cr | Blue-green. |
| 4 | do | 2-hydroxynaphthalene-4-sulphonic acid. | Co | Violet. |
| 5 | do | do | Cr | Do. |
| 6 | 5-nitro-2-amino-1-hydroxybenzene-4-methyl sulphone. | 1-hydroxynaphthalene-3,6-disulphonic acid. | Cr | Blue-violet. |
| 7 | do | 1-hydroxynaphthalene-4,7-disulphonic acid. | Co | Violet. |
| 8 | 5-nitro-2-amino-1-hydroxybenzene-4-ethyl sulphone. | 1-hydroxynaphthalene-5,7-disulphonic acid. | Co | Do. |
| 9 | do | 2-hydroxynaphthalene-4,7-disulphonic acid. | Cr | Blue-violet. |
| 10 | do | 2-hydroxynaphthalene-6-sulphonic acid. | Cr | Do. |
| 11 | 5-nitro-4-chloro-2-amino-1-hydroxybenzene. | 1-amino-8-hydroxynaphthalene-2-sulphonic acid. | Co | Blue. |
| 12 | do | do | Cr | Blue-green. |
| 13 | do | 2-hydroxynaphthalene-8-sulphonic acid. | Cr | Blue. |
| 14 | do | do | Co | Ruby. |
| 15 | do | 1-hydroxynaphthalene-5,8-disulphonic acid. | Cr | Blue. |
| 16 | 5-nitro-4-methyl-2-amino-1-hydroxybenzene. | 1-hydroxynaphthalene-4-sulphonic acid. | Co | Violet. |
| 17 | do | 1-amino-8-hydroxynaphthalene-2,4-disulphonic acid. | Cr | Blue-green. |
| 18 | do | do | Co | Blue. |
| 19 | do | 2-hydroxynaphthalene-3,6-disulphonic acid. | Cr | Blue-violet. |
| 20 | do | 1-hydroxynaphthalene-3,6,8-trisulphonic acid. | Co | Do. |

EXAMPLE 6

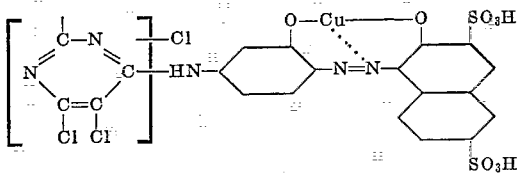

16.8 parts of 5-nitro-2-amino-1-methoxybenzene are diazotised in the usual way in dilute hydrochloric acid with 6.9 parts of sodium nitrite and the diazonium compound is coupled in the presence of 30 parts of sodium carbonate with 30.3 parts of 2-hydroxynaphthalene-3,6-disulphonic acid in 500 parts of water. As soon as the coupling is complete, the solution is heated to 40–45° and the nitro group is reduced with 43 parts of crystallised sodium sulphide by stirring for 1 hour at 40–45°. The amino monoazo dyestuff is precipitated with sodium chloride, filtered off and dissolved at 80–85° in 500 parts of water with the addition of 50 parts of 25% ammonia. The dyestuff solution is clarified by the addition of animal charcoal and then 25 parts of crystallised copper sulphate, 25 parts of dimethyl formamide and another 50 parts of 25% ammonia are added. The whole is stirred for 6 hours at 80–85° until the coppering is complete. The metallised amino monoazo dyestuff is precipitated by the addition of sodium chloride, filtered off at room temperature and washed with dilute sodium chloride solution. The filter cake is dissolved in 500 parts of 40–45° warm water and 21.8 parts of 2,4,5,6-tetrachloropyrimidine are added within 3 hours, the pH of the reaction mixture being kept at 6.5–7.0 by the simultaneous addition of sodium carbonate solution. As soon as no more free amino groups can be traced, the new dyestuff, which consists of a mixture of the isomeric 2,5,6-trichloropyrimidinyl - (2)-amino-and 4,5,6-trichloropyrimidinyl-(2)-aminoazo dyestuff, is precipitated with sodium chloride, filtered off, washed with sodium chloride solution and dried at 60–65° in vacuo. It is a dark red powder which dissolves in water with a ruby-red colour.

If cotton or staple rayon is printed with a paste consisting of 30 parts of the above dyestuff, 30 parts of potassium carbonate, 200 parts of urea, 190 parts of water and 450 parts of a 5% sodium alginate solution, then steamed for 10 minutes at 100–110° or heated for 4 minutes at 140–160°, rinsed and finally soaped at the boil for 30 minutes, then a deep ruby-red print is obtained which has good light and wet fastness properties.

The printing colour described can be stored well.

More blue coloured dyestuffs having similar properties are obtained if, in the above example, instead of the 16.8 parts of 5-nitro-2-amino-1-methoxybenzene, the equivalent amount of 5-nitro-2-amino-1,4-dimethoxybenzene or 5-nitro-2-amino-1,4-diethoxybenzene is used or if the equivalent amount of 5-nitro-2-amino-4-methyl-1-methoxybenzene is used. If, in the above example, instead of the 21.8 parts of 2,4,5,6-tetrachloropyrimidine, the equivalent amount of 5-bromo-2,4,6-trichloropyrimidine, 2,4,6-trichloropyrimidine, or 2,4,6-tribromopyrimidine is used, then similar dyestuffs are obtained which produce prints on cellulose fibres having equally good fastness properties.

Very good dyestuffs are also obtained if, in the above example, instead of the 30.3 parts of 2-hydroxynaphthalene-3,6-disulphonic acid, and equivalent amount of one of the coupling components given in the following table is used.

| Dyestuff No. | Coupling component | Shade on cellulose fibres |
|---|---|---|
| 1 | 1-hydroxynaphthalene-4,8-disulphonic acid. | Violet. |
| 2 | 1-hydroxynaphthalene-3,8-disulphonic acid. | Do. |
| 3 | 1-hydroxynaphthalene-3,6-disulphonic acid. | Do. |
| 4 | 1-hydroxynaphthalene-5,7-disulphonic acid. | Ruby. |
| 5 | 2-hydroxynaphthalene-5,7-disulphonic acid. | Do. |
| 6 | 1-benzoylamino-8-hydroxynaphthalene-3,6-disulphonic acid. | Blueish violet. |
| 7 | 1-acetylamino-8-hydroxynaphthalene-3,6-disulphonic acid. | Do. |
| 8 | 1-benzoylamino-8-hydroxynaphthalene-4,6-disulphonic acid. | Do. |
| 9 | 1-acetylamino-8-hydroxynaphthalene-4,6-disulphonic acid. | Violet. |
| 10 | 1-phenylamino-8-hydroxynaphthalene-4,6-disulphonic acid. | Navy blue. |
| 11 | 1-amino-8-hydroxynaphthalene-2,4-disulphonic acid. | Blue. |
| 12 | 2-amino-5-hydroxynaphthalene-1,7-disulphonic acid. | Violet. |
| 13 | 1-carbomethoxyamino-8-hydroxynaphthalene-3,6-disulphonic acid. | Do. |
| 14 | 1-carbomethoxyamino-8-hydroxynaphthalene-4,6-disulphonic acid. | Do. |
| 15 | 1-hydroxynaphthalene-3,6,8-trisulphonic acid. | Do. |
| 16 | 1-propionylamino-8-hydroxynaphthalene-3,6-disulphonic acid. | Blueish violet. |
| 17 | 1-propionylamino-8-hydroxynaphthalene-4,6-disulphonic acid. | Do. |

What is claimed is:

1. A monoazo dyestuff of the formula

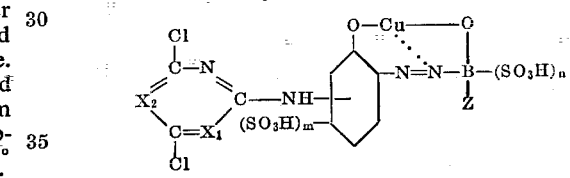

wherein B represents the naphthalene radical containing the oxygen atom in the o-position to the azo linkage; of $X_1$ and $X_2$, the one is =N— and the other is

$n$ is a whole positive number of at most 3, $m$ represents one of the numerals 0 and 1, Z represents hydrogen or NHX and X represents hydrogen or phenyl.

2. The monoazo dyestuff according to claim 1, of the formula

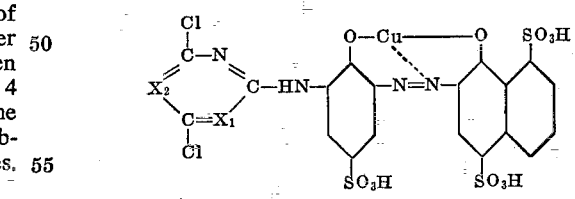

wherein of $X_1$ and $X_2$, the one is =N— and the other is

3. The monoazo dyestuff of the formula

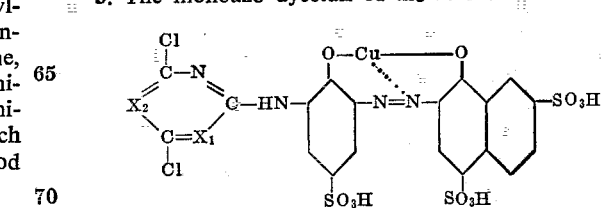

wherein of $X_1$ and $X_2$, the one is =N— and the other is

4. The monoazo dyestuff, according to claim 1, of the formula

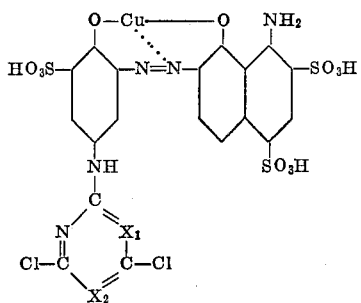

wherein of $X_1$ and $X_2$, the one is $=N-$ and the other is

5. The monoazo dyestuff, according to claim 1, of the formula

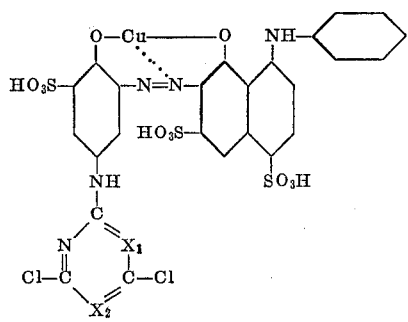

wherein of $X_1$ and $X_2$, the one is $=N-$ and the other is

6. The monoazo dyestuff, according to claim 1, of the formula

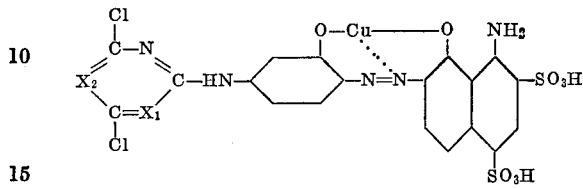

wherein of $X_1$ and $X_2$, the one is $=N-$ and the other is

References Cited
UNITED STATES PATENTS

| | | | |
|---|---|---|---|
| 3,127,389 | 3/1964 | Seitz et al. | 260—146 |
| 3,133,909 | 5/1964 | Riat | 260—146 |
| 3,208,990 | 9/1965 | Benz et al. | 260—146 |
| 3,288,777 | 11/1966 | Benz et al. | 260—146 |

FLOYD D. HIGEL, Primary Examiner

U.S. Cl. X.R.

8—42, 63, 71; 260—151, 154

PO-1050
(5/69)

UNITED STATES PATENT OFFICE
CERTIFICATE OF CORRECTION

Patent No. 3,502,642    Dated March 24, 1970

Inventor(s) PAUL DUSSY

It is certified that error appears in the above-identified patent and that said Letters Patent are hereby corrected as shown below:

Claim 1, line 2, the formula should read as follows:

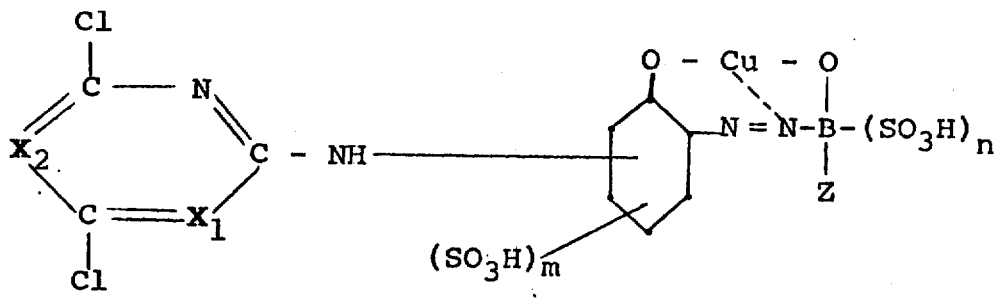

Claim 3, rewrite line 1 to read:

3. The monoazo dyestuff according to claim 1, of the formula

SIGNED AND
SEALED
OCT 27 1970

(SEAL)
Attest:

Edward M. Fletcher, Jr.
Attesting Officer

WILLIAM E. SCHUYLER, JR.
Commissioner of Patents